(12) United States Patent
Takamatsu et al.

(10) Patent No.: US 7,562,840 B2
(45) Date of Patent: Jul. 21, 2009

(54) WEBBING TAKE-UP DEVICE

(75) Inventors: Hitoshi Takamatsu, Aichi-ken (JP); Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 338 days.

(21) Appl. No.: 11/334,734

(22) Filed: Jan. 19, 2006

(65) Prior Publication Data

US 2006/0169820 A1     Aug. 3, 2006

(30) Foreign Application Priority Data

Jan. 20, 2005     (JP)     ............... 2005-013346

(51) Int. Cl.
*B60R 22/405*     (2006.01)
*B60R 22/41*     (2006.01)

(52) U.S. Cl. .............. 242/383.1; 242/383.4; 242/384.1; 242/384.6

(58) Field of Classification Search ............... 242/382.1, 242/382, 2, 382.4, 383, 383.1, 383.2, 383.4, 242/384, 384.1, 384.6; 280/805, 806, 807; 297/472, 476, 478

See application file for complete search history.

(56) References Cited

U.S. PATENT DOCUMENTS

| | | | | |
|---|---|---|---|---|
| 3,901,459 | A | * | 8/1975 | Romanzi et al .......... 242/384.1 |
| 4,135,682 | A | * | 1/1979 | Mizuno .................... 242/383.4 |
| 4,635,874 | A | * | 1/1987 | Swindlehurst ........... 242/383.1 |
| 4,858,847 | A | * | 8/1989 | Ogris ....................... 242/383.2 |
| 4,948,066 | A | * | 8/1990 | Matsumoto et al. ...... 242/382.2 |
| 5,044,575 | A | | 9/1991 | Knabel et al. |

(Continued)

FOREIGN PATENT DOCUMENTS

DE     34 18 378 A1     2/1986

(Continued)

OTHER PUBLICATIONS

Enyu Zhu, Chinese Office Action, dated May 18, 2007.

*Primary Examiner*—Peter M Cuomo
*Assistant Examiner*—Scott Haugland
(74) *Attorney, Agent, or Firm*—Roberts Mlotkowski Safran & Cole, P.C.; Thomas W. Cole

(57) ABSTRACT

A webbing take-up device includes: a spool to which a base end portion of a long band-like webbing belt is attached and which is rotatable such that the webbing belt can be taken up and pulled out; and a rotating body that is coaxially relatively rotatable with respect to the spool. A coupling member, which causes the rotating body to rotate in a pullout direction together with the spool rotating in the pullout direction of the webbing belt when the coupling member is directly or indirectly engaged with the spool, is disposed on the rotating body. The webbing take-up device also includes: a lock member that regulates the rotation of the spool; acceleration detecting unit that is actuated when a vehicle disposed with the webbing take-up device abruptly decelerates; rotation detecting unit that is actuated by the abrupt rotation of the spool in the pullout direction and causes the coupling member to move to a position where the coupling member is engageable with the spool; and regulating unit that engages with the coupling member when the webbing belt has been taken up and accommodated onto the spool and regulates the displacement of the coupling member toward the engageable position.

11 Claims, 4 Drawing Sheets

U.S. PATENT DOCUMENTS

| | | | |
|---|---|---|---|
| 5,622,327 A * | 4/1997 | Heath et al. | 242/383.4 |
| 5,624,087 A * | 4/1997 | Dick et al. | 242/381.1 |
| 6,283,398 B1 | 9/2001 | Specht | |
| 6,631,865 B2 * | 10/2003 | Palliser | 242/382.2 |
| 6,655,626 B2 * | 12/2003 | Snyder | 242/382.2 |
| 2001/0038054 A1 * | 11/2001 | Mori et al. | 242/382.2 |
| 2005/0133652 A1 * | 6/2005 | Kielwein | 242/383.4 |

FOREIGN PATENT DOCUMENTS

| | | |
|---|---|---|
| DE | 197 58 495 A1 | 2/1999 |
| EP | 0 112 033 A2 | 6/1984 |
| EP | 0 307 822 A2 | 3/1989 |
| EP | 1 394 004 A1 | 3/2004 |
| JP | 62-95058 U | 6/1987 |
| JP | 8-119064 A | 5/1996 |

* cited by examiner

F I G. 3
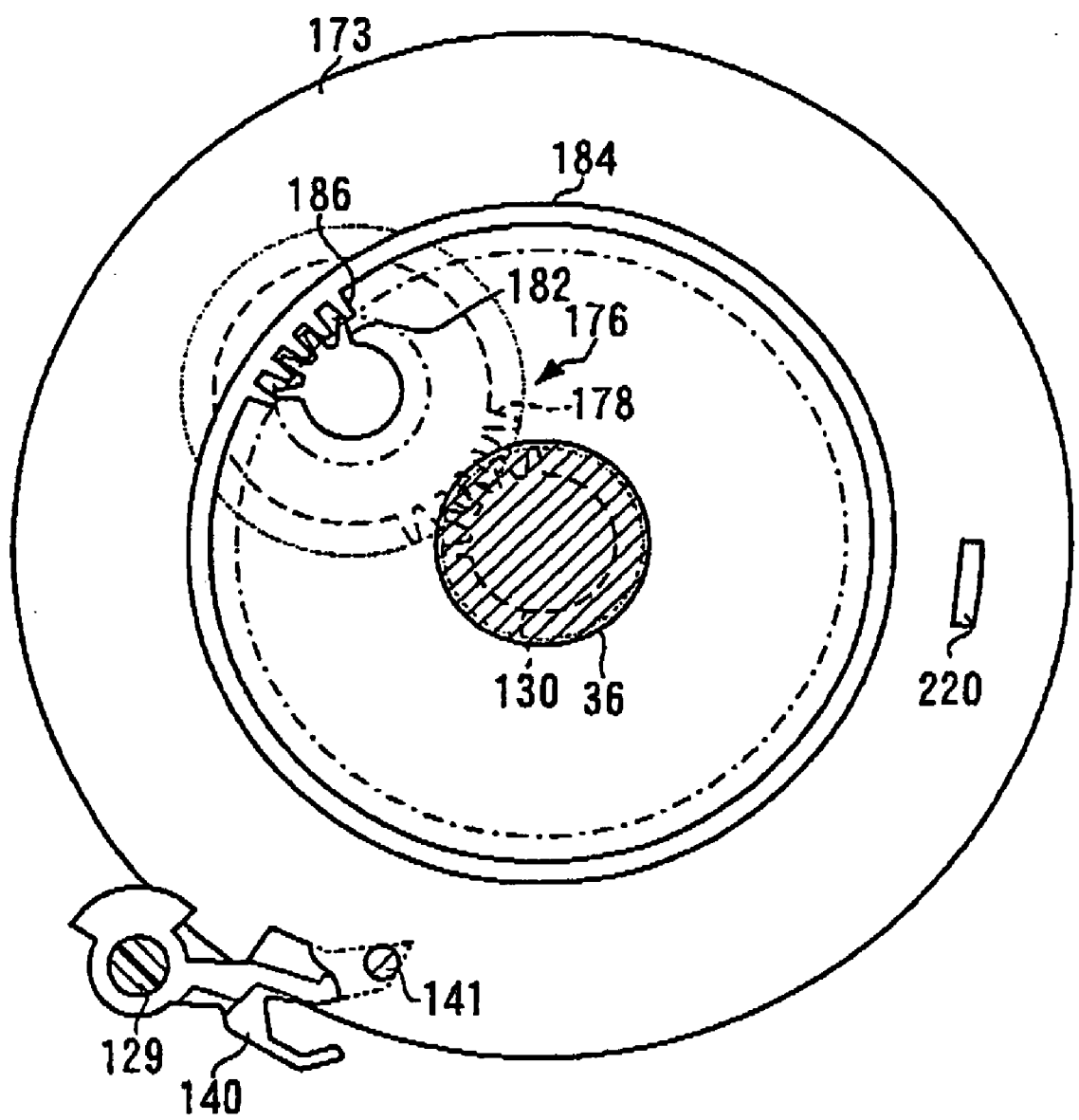

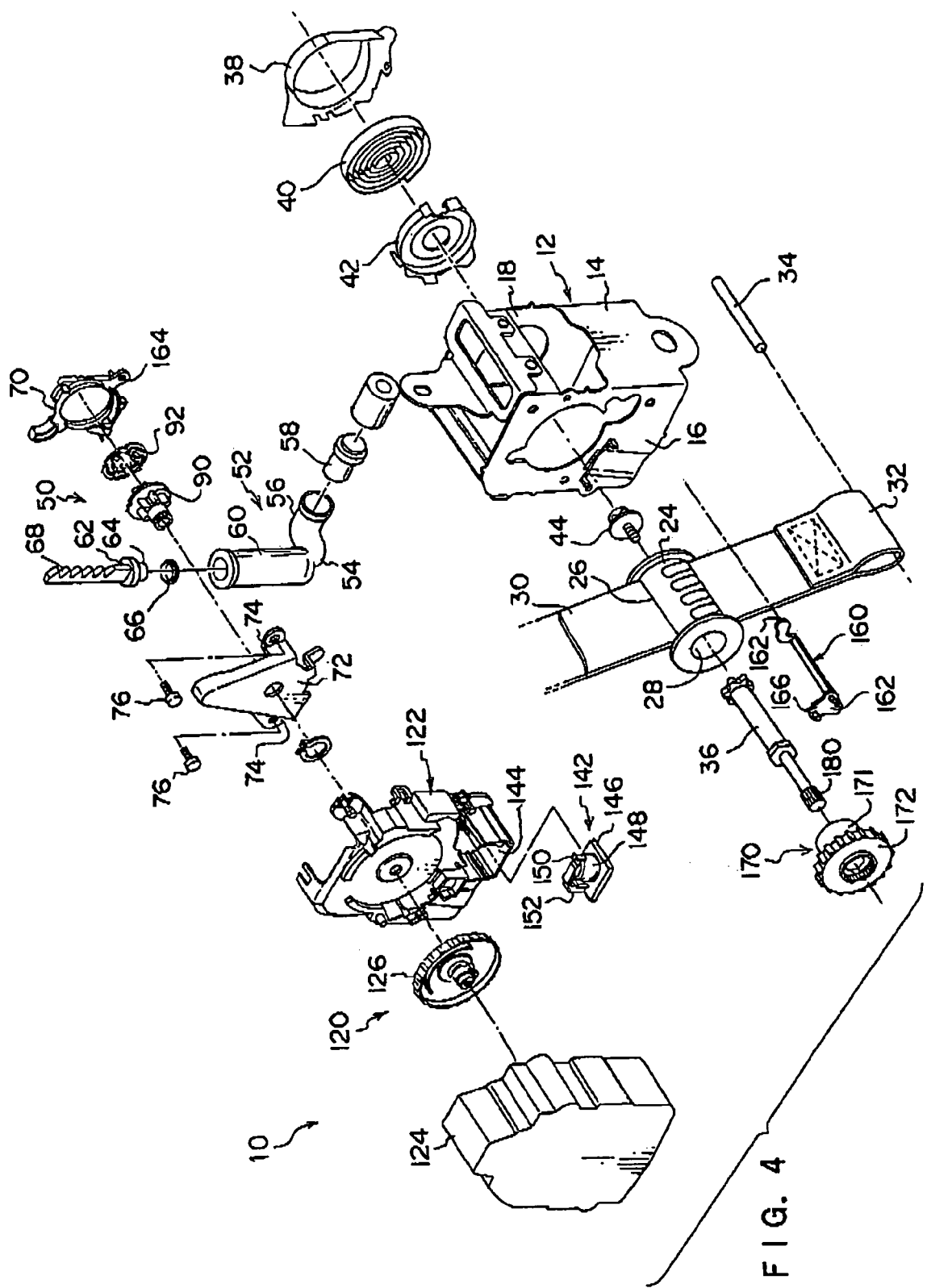
F I G. 4

WEBBING TAKE-UP DEVICE

CROSS-REFERENCE TO RELATED APPLICATION

This application claims priority under 35 USC 119 from Japanese Patent Application No. 2005-13346, the disclosure of which is incorporated by reference herein.

BACKGROUND OF THE INVENTION

1. Field of the Invention

The present invention relates to a webbing take-up device that takes up and accommodates a long band-like webbing belt that restrains the body of a vehicular passenger.

2. Description of the Related Art

Seat belt apparatuses that restrain the body of a passenger with a long band-like webbing belt include a webbing take-up device. The webbing take-up device includes a spool. The longitudinal-direction base end of the webbing belt is attached to the spool. When the spool is rotated in a take-up direction, which is one direction around its axis, the webbing belt is taken up from its base end and accommodated onto the spool.

The webbing take-up device also includes a lock mechanism for locking the spool when a vehicle disposed with the webbing take-up device abruptly decelerates, regulating the pullout of the webbing belt, and restraining the body of the passenger, which tries to move in the substantially forward direction of the vehicle. An example of a webbing take-up device including such a lock mechanism is disclosed in Japanese Utility Model Application Publication No. 62-95058.

In the webbing take-up device disclosed in Japanese Utility Model Application Publication No. 62-95058, a lock ring is disposed coaxially and relatively rotatable with respect to the spool. A lock plate is coupled to the spool between the lock ring and the spool. When the spool relatively rotates in the pullout direction of the webbing belt with respect to the lock ring, the lock plate is displaced outward in the radial direction of turning of the spool and meshes with an inner ratchet formed on a leg plate of a frame. Thus, the spool becomes locked, and the rotation of the spool when the webbing belt is pulled out is regulated.

The lock ring and the spool are coupled together with a torsion coil spring and configured such that the lock ring can rotate following the rotation of the spool due to the biasing force of the torsion coil spring.

That is, the lock ring rotates following the rotating spool when the webbing belt is ordinarily pulled out and taken up. However, when the vehicle abruptly decelerates, the body of the passenger moves in the substantially forward direction of the vehicle. Thus, when the webbing belt is abruptly pulled out and the spool abruptly rotates in the pullout direction, the lock ring cannot follow the spool and the spool relatively rotates in the pullout direction with respect to the lock ring. Thus, as described above, the lock plate meshes with the ratchet of the leg plate, the spool becomes locked, and the pullout of the webbing belt is regulated.

The webbing take-up device also includes a coil spring whose biasing force, which biases the spool in the take-up direction, increases in accompaniment with the rotation of the spool in the pullout direction. The biasing force of the coil spring causes the spool to rotate in the take-up direction when the pulled-out webbing belt is to be taken up.

The lock ring also rotates following the spool when the spool is rotating in the take-up direction in this manner. When the taking-up of the webbing belt onto the spool by the biasing force of the coil spring ends and the spool stops, there is the potential for the lock ring to end up rotating in the take-up direction due to inertia.

In this manner, the situation where the lock ring has rotated in the take-up direction with respect to the spool is the same as the situation where the spool has rotated in the pullout direction with respect to the lock ring. For this reason, even in this state, the lock plate ends up being displaced and meshing with the ratchet of the leg plate.

Because the rotation of the spool in the pullout direction ends up being regulated in this state (so-called "end lock"), the webbing belt that has been taken up and accommodated onto the spool cannot be pulled out.

In the webbing take-up device disclosed in Japanese Utility Model Application Publication No. 62-95058, an end lock preventing mechanism is disposed in order to prevent this drawback.

The end lock preventing mechanism in Japanese Utility Model Application Publication No. 62-95058 includes a cam plate and a function spring that prevent end lock by deterring the relative rotation of the lock ring and the take-up shaft at a predetermined time.

However, the webbing take-up device including this conventional end lock preventing mechanism has a configuration that simply nips a cam plate with a friction spring. For this reason, when the spool abruptly rotates in the take-up direction and takes up the webbing belt, the cam plate pivots due to frictional force that is larger than the frictional force between the friction spring and the cam plate in the state where the friction spring is nipping the cam plate. Thus, there is the potential for end lock to arise.

SUMMARY OF THE INVENTION

In view of the above-described circumstance, it is an object of the present invention to obtain a webbing take-up device that can prevent or effectively suppress the occurrence of end lock when the spool rotating in the take-up direction stops.

A first aspect of the invention provides a webbing take-up device comprising: a spool to which a base end portion of a long band-like webbing belt is attached, with the spool taking up and accommodating the webbing belt as a result of the spool being rotated in a take-up direction that is one direction around its axis, and from which the webbing belt is pulled out as a result of the spool being rotated in a pullout direction opposite from the take-up direction due to the webbing belt being pulled toward its leading end; a rotating body that is coaxially relatively rotatable with respect to the spool; a coupling member that is disposed on the rotating body such that it is displaceable between a position where the coupling member is directly or indirectly engageable with the spool and a position where the coupling member disengages from the spool, and when the coupling member is directly or indirectly engaged with the spool, the coupling member causes the rotating body to rotate in the pullout direction together with the spool rotating in the pullout direction; a lock member that directly or indirectly engages with the spool in conjunction with the rotating body rotating in the pullout direction and regulates the rotation of the spool in the pullout direction; an acceleration detecting unit that is actuated when a vehicle disposed with the webbing take-up device abruptly decelerates, and which causes the coupling member to move to the engageable position; a rotation detecting unit that is actuated by an abrupt rotation of the spool in the pullout direction and causes the coupling member to move to the engageable position; and a regulating unit that engages with the coupling member when the webbing belt has been taken up and accommodated onto the spool and regulates the displacement of the coupling member toward the engageable position.

A second aspect of the invention provides a webbing take-up device comprising: a spool to which a base end portion of a long band-like webbing belt is attached, with the spool taking up and accommodating the webbing belt as a result of the spool being rotated in a take-up direction that is one direction around its axis, and from which the webbing belt is pulled out as a result of the spool being rotated in a pullout direction opposite from the take-up direction due to the webbing belt being pulled toward its leading end; a rotating body that is coaxially relatively rotatable with respect to the spool; a coupling member that is disposed on the rotating body such that it is displaceable between a position where the coupling member is directly or indirectly engageable with the spool and a position where the coupling member disengages from the spool, and when the coupling member is directly or indirectly engaged with the spool, the coupling member causes the rotating body to rotate in the pullout direction together with the spool rotating in the pullout direction; a lock member that directly or indirectly engages with the spool in conjunction with the rotating body rotating in the pullout direction and regulates the rotation of the spool in the pullout direction; an acceleration detecting unit that is actuated when a vehicle disposed with the webbing take-up device abruptly decelerates, and which causes the coupling member to move to the engageable position; a rotation detecting unit that is actuated by an abrupt rotation of the spool in the pullout direction and causes the coupling member to move to the engageable position; and a regulating unit that engages with the coupling member when the webbing belt has been taken up and accommodated onto the spool and regulates the displacement of the coupling member toward the engageable position; wherein the regulating unit is configured comprising: a rotating member to which the rotation of the spool is transmitted after rotation speed reduction and which rotates substantially coaxially with respect to the spool by a predetermined angle of less than one rotation from a pulled-out state where the webbing belt has been completely pulled out from the spool, up to a completely taken-up state, where the webbing belt has been taken up and accommodated onto the spool; and a regulating portion that is integrally disposed on the rotating member, and which, in the completely taken-up state, faces the coupling member in the direction in which the coupling member displaces toward the engageable position and regulates the displacement of the coupling member toward the engageable position.

Other aspects, features and advantages of the present invention will become apparent from the following description taken in conjunction with the accompanying drawings.

BRIEF DESCRIPTION OF THE DRAWINGS

A preferred embodiment of the present invention will be described in detail based on the following figures, in which:

FIG. 3 is a front view corresponding to FIG. 2 showing a state where the regulating unit is no longer regulating the displacement of the coupling member; and FIG. 4 is an exploded perspective view schematically showing the overall configuration of the webbing take-up device pertaining to the embodiment of the invention.

DETAILED DESCRIPTION OF THE INVENTION

Figure 1:
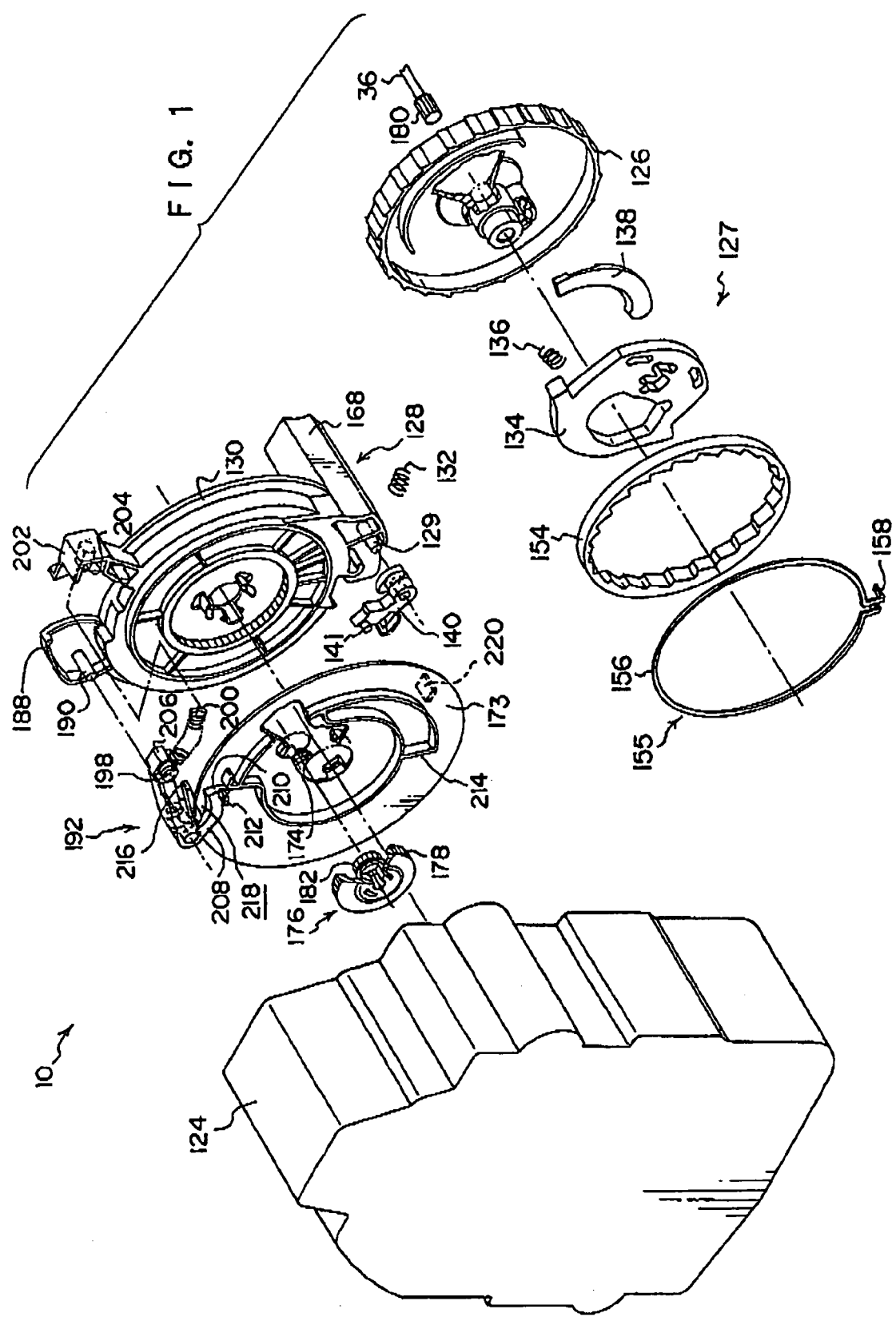
FIG. 1 is an exploded perspective view showing the configuration of relevant portions of a webbing take-up device pertaining to the embodiment of the invention.

FIG. 4 is an exploded perspective view schematically showing the overall configuration of a webbing take-up device 10 pertaining to an embodiment of the invention. As shown in FIG. 4, the webbing take-up device 10 includes a frame 12.

The frame 12 includes a plate-like rear plate 14 whose thickness direction is along the substantial left-right direction of a vehicle disposed with the webbing take-up device 10. The rear plate 14 is fixed to the vehicle body in the vicinity of the lower end portion of a center pillar, for example, by a fixing unit such as a bolt. Thus, the webbing take-up device 10 is attached to the vehicle body.

The frame 12 also includes a leg plate 16 that is bent inward in the vehicle width direction (substantial left-right direction of the vehicle) from one width-direction end of the rear plate 14 along the substantial front-rear direction of the vehicle. The frame 12 further includes a leg plate 18 that is bent in the same direction as the leg plate 16 from the other width-direction end of the rear plate 14.

A spool 24 is disposed between the leg plate 16 and the leg plate 18. The spool 24 is formed in a substantially circular cylinder-like shape whose axial direction is along the direction in which the leg plate 16 and the leg plate 18 face each other. An insertion hole 26 is formed in the spool 24.

Both ends of the insertion hole 26 are open at the outer peripheral portion of the spool 24, and the openings are formed as slits along the axial direction of the spool 24. The insertion hole 26 is formed evading a through hole 28 that penetrates the axial center portion of the spool 24. A longitudinal-direction base end of a long band-like webbing belt 30 is inserted into the insertion hole 26 from one open end of the insertion hole 26.

A tubular portion 32 with a through hole in the axial direction is formed in the longitudinal-direction base end portion of the webbing belt 30. A retaining shaft 34 is disposed inside the tubular portion 32 passed through the insertion hole 26, whereby the base end of the webbing belt 30 is prevented from escaping from the insertion hole 26 when the webbing belt 30 is pulled toward its leading end.

The webbing belt 30, which is prevented from escaping from the insertion hole 26 in this manner, is taken up from its base end and accommodated in layers on the outer peripheral portion of the spool 24 as a result of the spool 24 rotating in a take-up direction, which is one direction around its axis.

A rod-like torsion shaft 36 whose longitudinal direction is along the axial direction of the spool 24 is disposed inside the through hole 28. The torsion shaft 36 is coupled to the spool 24, at the inside of the spool 24 near the leg plate 18, in a state where the torsion shaft 36 is prevented from being rotated about the axial direction. Moreover, the end portion of the torsion shaft 36 near the leg plate 18 penetrates the leg plate 18 and protrudes outward of the frame 12.

A spring cover 38 is disposed at the outer side of the leg plate 18. The spring cover 38 has a box-like shape that opens toward the leg plate 18 and is fixed to the leg plate 18 by fixing unit such as a screw or by being fitted together with the leg plate 18 with a fitting claw or the like formed on the spring cover 38 or the leg plate 18.

A spiral spring 40 is housed inside the spring cover 38. The spiral spring 40 is a spring with a structure whose biasing force gradually increases as a result of its spiral-direction inner end being rotatingly displaced with respect to its spiral-direction outer end in a pullout direction opposite from the take-up direction. The spiral-direction outer end of the spiral spring 40 is attached to a spring seat 42 disposed further towards the open side of the spring cover 38 than the spiral spring 40.

The spring seat 42 is fixed to the spring cover 38, and the spiral-direction outer end of the spiral spring 40 is coupled to the leg plate 18 (frame 12) via the spring seat 42 and the spring cover 38. An adapter 44 is disposed in the vicinity of the spiral-direction inner end of the spiral spring 40.

The spiral-direction inner end of the spiral spring 40 is fixed to part of the outer periphery of the adapter 44. Moreover, the end portion of the torsion shaft 36 near the leg plate 18 penetrating the spring seat 42 is fitted together with and fixed to the axial center portion of the adapter 44.

A pretensioner 50 is disposed at the outer side of the leg plate 16. The pretensioner 50 includes a cylinder 52.

In the present embodiment, the cylinder 52 is formed by plastically deforming and appropriately bending a metal pipe at a bent portion 54 set in the axial-direction intermediate portion of the pipe, such that the cross-sectional shape of the pipe is deformed while its inner communication is retained, for example. One side of the cylinder 52 in the axial direction from the bent portion 54 serves as an attachment portion 56. The attachment portion 56 includes an open end to which a gas generator 58 is attached.

The gas generator 58 is electrically or mechanically connected to an unillustrated acceleration sensor. When the acceleration sensor detects the acceleration (deceleration) when the vehicle abruptly decelerates, a gas generating agent disposed inside the gas generator 58 is ignited. Thus, the gas generating agent is burned in an extremely short amount of time and instantaneously generates gas.

The other side of the bent portion 54 opposite from the attachment portion 56 serves as a cylinder body 60. Although the bent portion 54 is plastically deformed and bent as described above, its inner communication is ensured so that the gas generated by the gas generator 58 attached to the attachment portion 56 is supplied to the bottom portion of the cylinder body 60. A piston 62 is disposed inside the cylinder body 60.

The piston 62 is formed in a discoid shape whose outer diameter dimension is substantially equal to (strictly speaking, slightly smaller than) the inner diameter dimension of the cylinder body 60. A circular cylinder-like retaining portion 64 is formed coaxially and integrally with respect to the piston 62 on the end surface of the piston 62 facing the bottom portion of the cylinder body 60. The outer diameter dimension of the retaining portion 64 is smaller than that of the piston 62, and a sealing member 66 is fitted onto the outer peripheral portion of the retaining portion 64.

The sealing member 66 is formed in an annular shape and is elastic. The sealing member 66 pressingly contacts both the outer peripheral portion of the retaining portion 64 and the inner peripheral portion of the cylinder body 60 in a state where the piston 62 is disposed inside the cylinder body 60, and seals the space between the retaining portion 64 and the cylinder body 60. For this reason, when the gas is supplied to the inside of the cylinder body 60 and the internal pressure of the cylinder body 60 rises, the piston 62 slides toward the upper end of the cylinder body 60.

A rack bar 68 serving as a slide member is formed on the side of the piston 62 opposite from the side disposed with the retaining portion 64 (that is, at the open end side of the cylinder body 60). The rack bar 68 has a square bar-like shape along the open direction of the cylinder body 60, and plural rack teeth are formed on one width-direction end of the rack bar 68 at constant intervals along the longitudinal direction of the rack bar 68.

A gear case 70 serving as a support member is disposed in the vicinity of the open end of the cylinder body 60 near the leg plate 16. A cover plate 72 is disposed at the side of the cylinder body 60 opposite from the side near the gear case 70.

The cover plate 72 is formed in a box-like shape that covers, from the side of the cylinder body 60 opposite from the side near the leg plate 16, the rack bar 68 protruding from the cylinder body 60, and is formed in a shape that does not interfere with at least the rack bar 68 protruding from the open end of the cylinder body 60. Plural fixing pieces 74 are formed on the outer peripheral portion of the cover plate 72. The fixing pieces 74 are fixed to the leg plate 16 by screws 76, whereby the cover plate 72 is fixed to the frame 12.

Moreover, an unillustrated retaining portion, into which the open end of the cylinder body 60 and the portion in the vicinity thereof are fitted, is formed on the cover plate 72. Thus, the cover plate 72 is coupled to the cylinder body 60. A pinion 90 is disposed between the cover plate 72 and the gear case 70.

The pinion 90 meshes with the rack teeth at the leading end side of the rack bar 68, is rotatably supported on the other end of the torsion shaft 36 penetrating the leg plate 16 and the gear case 70, and rotates in the take-up direction due to the rising of the rack bar 68.

A clutch 92 is disposed on the side of the pinion 90 facing the leg plate 16. Because the clutch 92 is rotatably supported on the torsion shaft 36, it does not rotate even if the torsion shaft 36 rotates. However, the clutch 92 is engaged with the pinion 90, and when the pinion 90 rotates in the take-up direction, part of the clutch 92 becomes deformed and is caused to be coupled to the torsion shaft 36 due to the rotational force.

A lock mechanism 120 is disposed at the side of the leg plate 16. The lock mechanism 120 includes a sensor holder 122. The sensor holder 122 is formed in a concave shape that partially opens toward the leg plate 16, and part of the cover plate 72 is positioned inside the portion opening toward the leg plate 16.

The sensor holder 122 includes circular cylinder-like protrusions that protrude from predetermined sites on the outer peripheral portion of the sensor holder 122 toward the leg plate 16. The sensor holder 122 is fixed to the leg plate 16 by press-fitting a retaining pins into the inside of the protrusions in a state where it has been fitted into a hole portion formed in the leg plate 16.

A sensor cover 124 is disposed on the side of the sensor holder 122 opposite from the side facing the leg plate 16. Fitting claws or the like are formed on the outer peripheral portion and the like of the sensor cover 124. The fitting claws fit together with predetermined sites on the sensor holder 122 such that the sensor cover 124 is mechanically coupled to the sensor holder 122. An unillustrated cylindrical shaft receiving portion is formed in the sensor cover 124, and the shaft receiving portion rotatably supports the other end portion of the torsion shaft 36 penetrating the sensor holder 122.

A V gear 126 is disposed between the sensor holder 122 and the sensor cover 124. The V gear 126 is formed in a shallow-bottomed circular cylinder-like shape (or basin shape) that opens toward the sensor cover 124. Ratchet teeth are formed on the outer peripheral surface of the outer peripheral portion of the V gear 126. The torsion shaft 36 penetrates the V gear 126, and the V gear 126 is attached to the torsion shaft 36 such that it is coaxial and integrally rotatable with respect to the torsion shaft 36.

As shown in FIG. 1, which shows the configuration between the V gear 126 and the sensor cover 124 of FIG. 4, a rotation detecting mechanism 127 serving as rotation detecting unit is disposed inside the V gear 126. The rotation detecting mechanism 127 includes a gear ring 154. The gear ring 154 is formed in a ring-like shape that is coaxial with respect to the V gear 126, and is supported on a support portion disposed on the V gear 126 such that the gear ring 154 is coaxially relatively rotatable with respect to the V gear 126.

Inner ratchet teeth are formed on the inner peripheral portion of the gear ring 154. A W pawl 134 is disposed inside the gear ring 154 in correspondence to the inner ratchet teeth of the gear ring 154.

The W pawl 134 is supported, such that it is swingable around an axis parallel to the torsion shaft 36, on a pin formed on the V gear 126 at a position displaced with respect to the axial center of the torsion shaft 36.

The W pawl 134 swings toward and away from the inner peripheral portion of the gear ring 154. When the W pawl 134 moves toward the inner peripheral portion of the gear ring 154, it meshes with the ratchet teeth formed on the inner peripheral portion of the gear ring 154. When the V gear 126 rotates in the pullout direction in this meshed state, the rotational force of the V gear 126 in the pullout direction is transmitted to the gear ring 154 via the W pawl 134 and causes the gear ring 154 to rotate in the pullout direction.

A W mass 138 that configures the rotation detecting unit together with the W pawl 134 is attached as a weight to the W pawl 134. Moreover, one end of a return spring 136 is attached to the W pawl 134. The other end of the return spring 136 is attached to the V gear 126, and the W pawl 134 is biased in the direction in which it disengages from the gear ring 154 (the direction in which the portion of the W pawl 134 meshing with the inner peripheral portion of the gear ring 154 separates from the inner peripheral portion of the gear ring 154).

A friction spring 155 is disposed on the gear ring 154. The friction spring 155 includes a substantially ring-like body 156. The inner diameter dimension of the body 156 is substantially the same as, or very slightly smaller than, the outer diameter dimension of the gear ring 154. The body 156 is fitted to the outer peripheral portion of the gear ring 154.

The body 156 is coaxially relatively rotatable with respect to the gear ring 154, but it pressingly contacts the outer peripheral portion of the gear ring 154 due to its biasing force. Unless an external force that hinders the integral rotation of the body 156 with the gear ring 154 acts on the friction spring 155, the body 156 (friction spring 155) rotates integrally with the gear ring 154.

A sensor gear 128 serving as a rotating body is disposed at the side of the V gear 126 facing the sensor cover 124. The torsion shaft 36 coaxially penetrates a body 130 of the sensor gear 128. The body 130 of the sensor gear 128 is rotatably supported on the torsion shaft 36.

One end of a return spring 132 is attached to part of the sensor gear 128. The return spring 132 serves as a tension coil spring. The other end of the return spring 132 is attached to the sensor cover 124. The return spring 132 biases the sensor gear 128 in the take-up direction when the sensor gear 128 pivots in the pullout direction around the torsion shaft 36.

A push portion 168 that extends toward the V gear 126 is formed on the body 130 of the sensor gear 128. A shaft 129 is formed on, and protrudes from, the end portion of the push portion 168 on the side opposite from the end facing the V gear 126. A coupling pawl 140 serving as a coupling member is supported on the push portion 168 such that the coupling pawl 140 is pivotable around an axis parallel to (in the same direction as) the axial direction of the torsion shaft 36.

The coupling pawl 140 pivots toward and away from the outer peripheral portion of the V gear 126. When the V gear 126 rotates in the pullout direction in a state where the coupling pawl 140 has moved toward and engaged with the outer peripheral portion of the V gear 126, the rotation of the V gear 126 in the pullout direction is transmitted to the sensor gear 128 via the coupling pawl 140, and the sensor gear 128 rotates in the pullout direction together with the V gear 126.

A push portion 158 is formed on the body 156 of the friction spring 155 in correspondence to the coupling pawl 140. The push portion 158 is bent in a substantial hook-like shape, and the leading end thereof is positioned outward in the radial direction with respect to the body 156.

An engagement pin 141, which protrudes from the leading end of the coupling pawl 140 toward the side opposite from the side facing the V gear 126, is positioned on the rotational path of the push portion 158 when the body 156 is rotated together with the gear ring 154. When the push portion 158 contacts and pushes the engagement pin 141 as a result of the rotation of the body 156, the coupling pawl 140 pivots toward the outer peripheral portion of the V gear 126.

Moreover, an acceleration sensor 142 serving as acceleration detecting unit and shown in FIG. 4 is disposed below the coupling pawl 140. A box-like housing 144 that opens toward the sensor cover 124 is formed in the sensor holder 122 in correspondence to the acceleration sensor 142. At least part of the acceleration sensor 142 is housed in the housing 144.

The acceleration sensor 142 includes a mount 146. Overall, the mount 146 is formed in a flat plate-like shape whose thickness direction is in the vertical direction. A curved surface (not shown) that opens upward is formed in the upper surface of the mount 146. A hard ball 148 serving as an inertial body is disposed on the curved surface. A sensor pawl 150 is disposed above the hard ball 148.

The sensor pawl 150 is pivotably supported on the upper end of a vertical wall 152 disposed such that it protrudes upward from part of the outer periphery of the mount 146. The sensor pawl 150 is pushed upward as a result of the hard ball 148 rolling and rising on the curved surface of the mount 146. The sensor pawl 150 is pushed upward by the hardball 148, whereby the sensor pawl 150 is pivoted such that it contacts and pushes up the coupling pawl 140 shown in FIG. 1.

The V gear 126 is positioned in the pivoting direction of the coupling pawl 140 pivoted by the engagement of the sensor pawl 150. Thus, the coupling pawl 140 meshes with the V gear 126.

As shown in FIG. 4, the lock mechanism 120 includes a lock pawl 160 serving as a lock member. The lock pawl 160 includes a shaft 162. The axial direction of the shaft 162 is in a direction parallel to (in the same direction as) the axial direction of the spool 24. One end of the shaft 162 is pivotably supported in a shaft receiving hole (not shown) formed in the leg plate 18.

The other axial-direction end portion of the shaft 162 is pivotably supported in a shaft receiving hole 164 formed in the gear case 70. A pawl portion 166 is formed on the other axial-direction end of the shaft 162. The pawl portion 166 is a plate-like member whose thickness direction is along the axial direction of the shaft 162, and outer ratchet teeth are formed on part of the outer periphery of the pawl portion 166.

A lock base 170 is disposed at the side of the pawl portion 166 along the pivoting radius direction of the shaft 162. The lock base 170 includes an insertion portion 171. The insertion portion 171 is formed in a circular column-like shape and is rotatably inserted, coaxial with respect to the spool 24, into the other end portion of the through hole 28 in the spool 24.

The torsion shaft 36 coaxially penetrates the insertion portion 171, and therefore the lock base 170, in a state where it is fixed from rotation. The lock base 170 rotates coaxially and integrally with respect to the torsion shaft 36.

A ratchet portion 172 is integrally formed on the leg plate 16 side of the insertion portion 171. The ratchet portion 172 is formed coaxially with respect to the insertion portion 171, and ratchet teeth are intermittently formed on the outer peripheral portion of the ratchet portion 172.

The ratchet teeth of the pawl portion 166 of the lock pawl 160 mesh with the ratchet teeth of the ratchet portion 172 as a result of the shaft 162 pivoting in the take-up direction. When the pawl portion 166 and the ratchet portion 172 are meshed together, the rotation of the ratchet portion 172, and therefore the lock base 170, in the pullout direction is regulated.

The push portion 168 of the sensor gear 128 shown in FIG. 1 accommodates the pawl portion 166. When the body 130 of the sensor gear 128 pivots in the pullout direction, the push portion 168 pushes the pawl portion 166 and causes the lock pawl 160 to pivot in the take-up direction.

As shown in FIG. 1, a cam plate 173 that configures a regulating unit is disposed as a rotating member on the side of the sensor gear 128 opposite from the side facing the V gear 126. The cam plate 173 is formed in a substantially discoid shape and is rotatably supported on the torsion shaft 36.

A circular hole 174 is formed in the cam plate 173 at a position displaced outward in the radial direction from the center. A deceleration gear 176 is supported therein such that it is rotatable around an axis parallel to the spool 24. The deceleration gear 176 includes a gear portion 178. The gear portion 178 is an outer-toothed spur gear and is positioned on the side of the cam plate 173 opposite from the side facing the sensor gear 128. A gear 180 is disposed on the leading end of the torsion shaft 36 in correspondence to the gear portion 178. The gear 180 has fewer teeth than the gear portion 178, is disposed coaxially and integrally with respect to the torsion shaft 36, and meshes with the gear portion 178.

The deceleration gear 176 also includes a gear portion 182. The gear portion 182 is formed coaxially and integrally with respect to the gear portion 178 and has sufficiently fewer teeth than the gear portion 178. The gear portion 182 is also positioned on the sensor gear 128 side of the cam plate 173.

Figure 2:
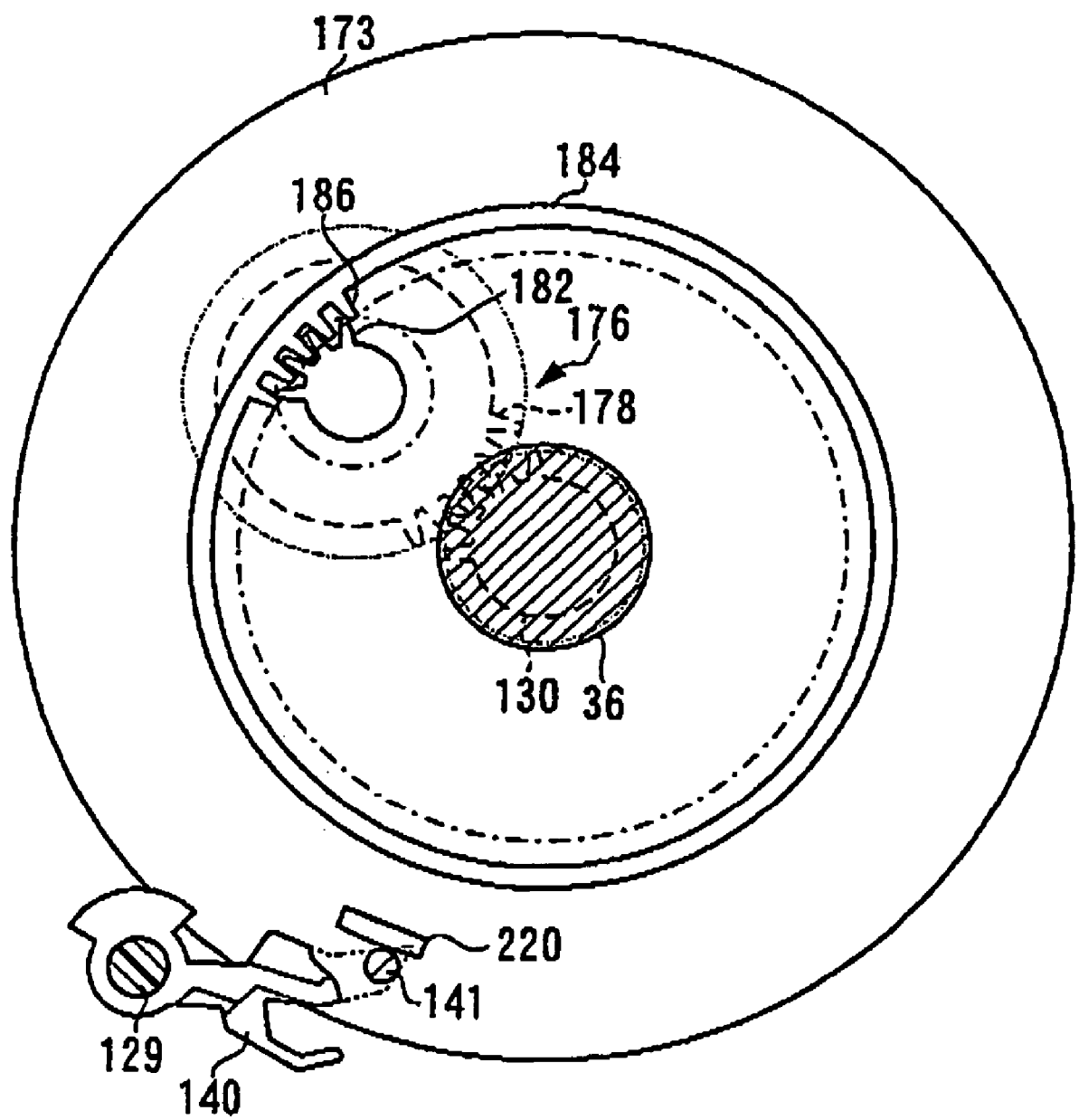
FIG. 2 is a front view showing a state where regulating unit is regulating the displacement of a coupling member.

As shown in FIG. 2, a ring-like rib 184 that is coaxial with respect to the spool 24 is formed on the surface of the cam plate 173 facing the sensor gear 128. An inner-toothed gear 186, which has a number of teeth that is sufficiently larger than that of the gear portion 182, is formed on the inner peripheral portion of the rib 184 and meshes with the gear portion 182.

Consequently, when the spool 24, and therefore the torsion shaft 36, rotates around its own axis, the rotational force is decelerated by the gear 180, the gear portion 178, the gear portion 182 and the gear 186, and is transmitted to the cam plate 173. Thus, the cam plate 173 rotates around the torsion shaft 36.

Below, the direction in which the cam plate 173 rotates in conjunction with the rotation of the torsion shaft 36 in the pullout direction will be called the "cam pullout direction," and the direction in which the cam plate 173 rotates in conjunction with the rotation of the torsion shaft 36 in the take-up direction will be called the "cam take-up direction."

As shown in FIG. 1, a lever housing 188 is formed on the body 130 of the sensor gear 128 at the side generally opposite from the side disposed with the push portion 168. A shaft 190 is formed in the lever housing 188 such that the shaft 190 protrudes parallel to the spool 24 and toward the side opposite from the V gear 126.

An ALR switch lever 192 is pivotably supported on the shaft 190. An attachment protrusion 198 is formed on the leading end portion of the ALR switch lever 192. One end of a coil spring 200 is attached to the attachment protrusion 198.

The other end of the coil spring 200 is attached to a retaining protrusion 204 of a spring retaining portion 202 formed on the body 130.

When the attachment protrusion 198 is positioned between the shaft receiving portion at the shaft 190 and the retaining protrusion 204, this is the neutral position of the ALR switch lever 192. When the ALR switch lever 192 pivots from the neutral position in an engagement direction, that is the pivot direction toward the rotational axial center of the sensor gear 128 around the shaft 190, or in a disengagement direction opposite from the engagement direction, the biasing force of the coil spring 200 biases the ALR switch lever 192 in its pivoting direction and causes the ALR switch lever 192 to pivot further.

As shown in FIG. 1, a coupling pawl 206 is formed from the leading end of the ALR switch lever 192 toward the V gear 126. The coupling pawl 206 is positioned at the side of the outer peripheral portion of the V gear 126 through a space between the spring retaining portion 202 and the lever housing 188. When the ALR switch lever 192 pivots around the shaft 190 toward the rotational center axis of the sensor gear 128 (that is, toward the torsion shaft 36), the coupling pawl 206 meshes with the V gear 126.

A contact portion 210 is formed such that it protrudes from the leading end of the ALR switch lever 192 toward the rotational axis center of the cam plate 173. A cam protrusion 212 and a cam wall 214 are formed in correspondence to the contact portion 210 on the side of the cam plate 173 opposite from the side facing the sensor gear 128.

The cam protrusion 212 is formed such that it can contact the contact portion 210 from the cam take-up direction side and from the side of the leading end of the ALR switch lever 192. The cam protrusion 212 contacts the contact portion 210 at the point when the spool 24, and therefore the torsion shaft 36, rotates just before the webbing belt 30 taken up onto the spool 24 is completely pulled out.

The cam wall 214 is formed such that it can contact, from the cam pullout direction, the contact portion 210 when the ALR switch lever 192 has pivoted in the engagement direction. Moreover, the cam wall 214 contacts the contact portion 210 when the spool 24, and therefore the torsion shaft 36, rotates and the webbing belt 30 is taken up onto the spool 24 at the point just before complete taking-up where a given amount of the webbing belt 30 remains.

As shown in FIG. 1, a stopper 220 that configures a regulating unit is disposed as a regulating portion on the cam plate 173. The stopper 220 is a plate-like portion that extends from part of the outer periphery of the cam plate 173 toward the sensor gear 128. As shown in FIG. 2, at a rotational position of the cam plate 173 corresponding to the completely taken-up state where the webbing belt 30 has been completely taken up onto the spool 24, the position at which the stopper 220 is formed on the cam plate 173 is set such that the stopper 220 faces the engagement pin 141 of the coupling pawl 140.

When the coupling pawl 140 tries to pivot toward the outer peripheral portion of the V gear 126 in a state where the stopper 220 and the engagement pin 141 are facing each other, the stopper 220 interferes with the engagement pin 141 and regulates the pivoting of the coupling pawl 140.

Next, the action and effects of the webbing take-up device 10 will be described.

In the webbing take-up device 10, when the webbing belt 30 taken up onto the spool 24 is pulled toward its leading end counter to the biasing force of the spiral spring 40, the spool 24 rotates in the pullout direction while the webbing belt 30 is pulled out.

The webbing belt 30 pulled out in this manner is placed around the body of the passenger, and a tongue plate disposed on the longitudinal-direction intermediate portion of the webbing belt 30, for example, is fastened in a buckle device disposed at the side of the seat in the vehicle. Thus, the webbing belt 30 is fastened around the body of the passenger, and the body of the passenger is restrained by the webbing belt 30.

When the vehicle disposed with the webbing take-up device 10 abruptly decelerates while the webbing belt 30 is fastened around the body of the passenger in this manner, the hard ball 148 rolls, whereby the sensor pawl 150 is pushed up by the hard ball 148. The sensor pawl 150 pushed up in this manner engages with the coupling pawl 140 of the sensor gear 128 and is pivoted such that it pushes up the coupling pawl 140. Thus, the coupling pawl 140 meshes with the V gear 126.

When the body of the passenger moves in the substantially forward direction of the vehicle due to inertia when the vehicle decelerates, the webbing belt 30 is abruptly pulled by the body of the passenger. Because the webbing belt 30 is abruptly pulled in this manner, rotational force in the pullout direction is abruptly imparted to the spool 24.

Basically, when the torsion shaft 36, and therefore the V gear 126, rotates in the pullout direction as a result of the spool 24 rotating in the pullout direction, the W pawl 134 rotates in the pullout direction together with the V gear 126. When the spool 24 abruptly rotates in the pullout direction as described above, however, because the W mass 138 is disposed on the W pawl 134, the W pawl 134 tries to remain at that position without rotating, due to inertia.

Thus, the W pawl 134 pivots relative to the gear ring 154 counter to the biasing force of the sensor spring 136. Due to the relative pivoting of the W pawl 134, the W pawl 134 moves toward the inner peripheral portion of the gear ring 154 and meshes with the ratchet teeth formed on the inner peripheral portion of the gear ring 154.

Because the W pawl 134 meshes with the gear ring 154, the rotational force of the spool 24 in the pullout direction is transmitted to the gear ring 154 via the torsion shaft 36, the V gear 126 and the W pawl 134, and the gear ring 154 rotates in the pullout direction together with the V gear 126.

Because the gear ring 154 rotates in the pullout direction, the function spring 155 pressingly contacting the outer peripheral portion of the gear ring 154 with biasing force rotates in the pullout direction together with the gear ring 154. When the friction spring 155 rotates a predetermined angle in the pullout direction in this manner, the push portion 158 contacts and pushes the engagement pin 141 of the coupling pawl 140.

In this manner, the coupling pawl 140 pivots as a result of the engagement pin 141 being pushed by the push portion 158, whereby the coupling pawl 140 meshes with the V gear 126.

When the coupling pawl 140 meshes with the V gear 126 as described above, the rotational force of the spool 24 in the pullout direction is transmitted to the sensor gear 128 via the torsion shaft 36, the V gear 126 and the coupling pawl 140. Thus, the sensor gear 128 rotates in the pullout direction.

When the sensor gear 128 rotates a certain angle in the pullout direction counter to the biasing force of the return spring 132, the push portion 168 disposed on the sensor gear 128 pushes the pawl portion 166 of the lock pawl 160 and causes the pawl portion 166 to pivot around the shaft 162.

When the pawl portion 166 pivots around the shaft 162 in this manner, the pawl portion 166 meshes with the ratchet portion 172 of the lock base 170 and regulates the rotation of the lock base 170, and therefore the spool 24, in the pullout direction. Thus, the body of the passenger, which tries to move under the influence of inertia in the substantially forward direction of the vehicle, can be reliably restrained and retained by the webbing belt 30.

When a child seat is fixed by the webbing belt 30 to a seat in the vehicle disposed with the webbing take-up device 10, the webbing belt 30 is completely pulled out.

When the webbing belt 30 is pulled out and causes the spool 24 to rotate in the pullout direction in this manner, the torsion shaft 36 rotates in the pullout direction, whereby the gear 180 rotates in the pullout direction. The rotation of the gear 180 in the pullout direction is transmitted to the cam plate 173 via the gear portions 178 and 182 and the gear 186, and the cam plate 173 rotates in the cam pullout direction.

When the cam plate 173 rotates in the cam pullout direction in this manner, the cam protrusion 212 moves, from the cam take-up direction side, toward the contact portion 210 of the ALR switch lever 192 in the disengaged position. Next, when the spool 24, and therefore the torsion shaft 36, reaches a rotational position immediately before the webbing belt 30 taken up onto the spool 24 is completely pulled out, the cam protrusion 212 contacts the contact portion 210.

When the spool 24 rotates further in the pullout direction in this state, the cam protrusion 212 pushes the contact portion 210 and causes the ALR switch lever 192 to pivot, from its neutral position, in the engagement direction counter to the biasing force of the coil spring 200. However, in this state, the ALR switch lever 192 does not pivot until the coupling pawl 206 is at the position where it meshes with the V gear 126.

In this manner, the webbing belt 30 is placed around a predetermined site on the child seat placed on the seat in a state where the webbing belt 30 has been completely pulled out. The tongue plate is then fastened and retained in the buckle device in this state, and the slack portion of the webbing belt 30 is taken onto the spool 24, whereby the child seat is retained by the webbing belt 30 and fixed on the seat.

When the spool 24 rotates in the take-up direction as a result of the slack portion of the webbing belt 30 being taken up onto the spool 24 as described above, the ALR switch lever 192 further pivots in the engagement direction due to the biasing force of the coil spring 200. Thus, the coupling pawl 206 engages with the V gear 126.

Consequently, when the spool 24 is rotated in the pullout direction in this state, the sensor gear 128 pivots in the pullout direction together with the V gear 126. When the sensor gear 128 pivots in the pullout direction, the pawl portion 166 of the lock pawl 160 is pushed by the push portion 168 and is caused to pivot around the shaft 162. Thus, the pawl portion 166 meshes with the ratchet portion 172 of the lock base 170, and the rotation of the lock base 170, and therefore the spool 24, in the pullout direction is regulated.

Because the pullout of the webbing belt 30 is regulated in this manner, as a result of the rotation of the spool 24 in the pullout direction being regulated, the child seat can be reliably fixed on the seat without the webbing belt 30, which is tightened around and fixes the child seat, becoming slack.

Also, when the tongue plate is removed from the buckle device and the webbing belt 30 is removed from the child seat, the spool 24 rotates in the take-up direction due to the biasing force of the spiral spring 40, and the webbing belt 30 is taken up onto the spool 24.

When the spool 24, and therefore the torsion shaft 36, rotates in the take-up direction in this manner, the cam plate 173 rotates in the cam take-up direction. When the cam plate 173 rotates in the cam take-up direction in this manner, the cam wall 214 moves, from the cam pullout direction side, toward the contact portion 210 in a state where the ALR switch lever 192 is positioned in its engaged position.

When the spool 24 arrives at the rotational position immediately before the webbing belt 30 is completely taken up, the cam wall 214 contacts the contact portion 210. Moreover, when the spool 24 rotates in the take-up direction until its rotational position is in the state where the webbing belt 30 is completely taken up in this state, the contact portion 210 is pushed by the cam wall 214.

Thus, the ALR switch lever 192 pivots in the disengagement direction from its neutral position counter to the biasing force of the coil spring 200, whereby the ALR switch lever 192 pivots to its disengaged position. When the ALR switch lever 192 pivots to its disengaged position in this manner, the coupling pawl 206 moves away and disengages from the V gear 126.

Incidentally, sometimes an abrupt rotational force in the pullout direction is also imparted to the spool 24 when, before placing the webbing belt 30 around his/her body, the passenger pulls the webbing belt 30 in order to pull out the webbing belt 30.

In this case also, as described above, the W pawl 134 meshes with the ratchet teeth formed on the inner peripheral portion of the gear ring 154, and the rotational force of the spool 24 in the pullout direction tries to cause the friction spring 155 to rotate in the pullout direction together with the gear ring 154. Consequently, in this case also, the coupling pawl 140 is pushed by the push portion 158.

Here, in a state where the webbing belt 30 has been completely taken up, the stopper 220 faces the engagement pin 141 of the coupling pawl 140 as shown in FIG. 2. Because the stopper 220 is formed on the cam plate 173, the cam plate 173 also rotates as a result of the spool 24 rotating in the pullout direction.

However, the rotation of the spool 24 is sufficiently decelerated and transmitted to the cam plate 173. Thus, the rotational amount of the cam plate 173 is also sufficiently small because the rotational amount of the spool 24 is small if the state is one immediately after the webbing belt 30 has started being pulled.

Consequently, in the state immediately after the webbing belt 30 has been pulled in order to pull out the webbing belt 30, the cam plate 173 rotates slightly, but the stopper 220 continues to face the engagement pin 141.

Even if the coupling pawl 140 tries to pivot toward the V gear 126 as a result of the engagement pin 141 being pushed by the push portion 158 as described above in this state, the stopper 220 facing the engagement pin 141 interferes in the rotational direction of the coupling pawl 140. Thus, the coupling pawl 140 cannot mesh with the V gear 126.

Consequently, in this state, the sensor gear 128 does not rotate in the pullout direction; and therefore the pawl portion 166 of the lock pawl 160 does not mesh with the ratchet portion 172 of the lock base 170.

Thus, in the state where the webbing belt 30 is completely taken up and in the state immediately after the webbing belt 30 has begun to be pulled out, the occurrence of "end lock," in which the rotation of the spool 24 is regulated in the pullout direction, can be extremely effectively prevented.

Also, as described above, in the state where the webbing belt 30 is completely taken up and in the state immediately after the webbing belt 30 has begun to be pulled out, even if the hard ball 148 rolls due to some kind of shock and tries to cause the coupling pawl 140 to pivot via the sensor pawl 150, the pivoting of the coupling pawl 140 is regulated by the stopper 220.

That is, in the present embodiment, as long as at least part of the stopper 220 is facing the coupling pawl 140, end lock does not occur even if either of the rotation detecting mechanism 127 or the acceleration sensor 142 is actuated.

Moreover, end lock when the rotation detecting mechanism 127 is actuated and end lock when the acceleration sensor 142 is actuated are both prevented as a result of the stopper 220 regulating the pivoting of the coupling pawl 140. For this reason, the mechanism for preventing end lock can be extremely effectively simplified, even though both end lock when the rotation detecting mechanism 127 is actuated, and end lock when the acceleration sensor 142 is actuated, can be prevented. Thus, an increase in weight accompanying an increase in the number of parts can be extremely effectively suppressed, and the webbing take-up device 10 can be made compact.

Moreover, when the webbing belt 30 is pulled out and the spool 24 rotates in the pullout direction, the cam plate 173 rotates as shown in FIG. 3. Due to this rotation of the cam plate 173, the stopper 220 no longer faces the engagement pin 141.

Here, the angle of rotation of the cam plate 173 resulting from the rotation of the spool 24 from the completely taken-up state of the webbing belt 30 to the completely pulled-out state of the webbing belt 30 (state where the webbing belt 30 has been completely pulled out from the spool 24) is less than 360 degrees. Consequently, after the state where the stopper 220 and the coupling pawl 140 face each other is eliminated as a result of the rotation of the spool 24 in the pullout direction, the stopper 220 does not face the engagement pin 141 even if the webbing belt 30 is completed pulled out.

For this reason, after the webbing belt 30 has been pulled out, the pawl portion 166 of the lock pawl 160 can mesh with the ratchet portion 172 of the lock base 170 when the vehicle abruptly decelerates and when the webbing belt 30 is abruptly pulled out, and the rotation of the spool 24 in the pullout direction can be reliably regulated.

Also, the mechanism for causing the stopper 220 to rotate in conjunction with the rotation of the spool 24 is basically a mechanism for causing the ALR switch lever 192 to pivot after the webbing belt 30 has been completely pulled out. Because the mechanism for causing the ALR switch lever 192 to pivot can be applied as the mechanism for causing the stopper 220 to rotate, the configuration can be extremely effectively simplified. In this sense also, an increase in weight accompanying an increase in the number of parts can be extremely effectively suppressed, and the webbing take-up device 10 can be made compact.

What is claimed is:

1. A webbing take-up device comprising:
a spool to which a base end portion of a long band-like webbing belt is attached, with the spool taking up and accommodating the webbing belt as a result of the spool being rotated in a take-up direction that is one direction around its axis, and from which the webbing belt is pulled out as a result of the spool being rotated in a pullout direction opposite from the take-up direction due to the webbing belt being pulled toward its leading end;
a rotating body that is coaxially relatively rotatable with respect to the spool;
a coupling pawl that is movably mounted on the rotating body such that it is displaceable between a position where the coupling pawl is directly or indirectly engaged with the spool and a position where the coupling pawl disengages from the spool, and when the coupling pawl is directly or indirectly engaged with the spool, the coupling pawl causes the rotating body to rotate in the pullout direction together with the spool rotating in the pullout direction;

a lock member that directly or indirectly engages with the spool in conjunction with the rotating body rotating in the pullout direction and regulates the rotation of the spool in the pullout direction;

an acceleration detecting unit that is actuated when a vehicle disposed with the webbing take-up device abruptly decelerates, and which causes the coupling pawl to move on the rotating body to the engaged position;

a rotation detecting unit including a W pawl that is actuated by an abrupt rotation of the spool in the pullout direction such that movement of the W pawl causes the coupling pawl to move on the rotating body to the engaged position; and a regulating unit that engages with the coupling pawl when the webbing belt has been taken up and accommodated onto the spool and regulates the displacement of the coupling pawl toward the engaged position, including a rotating member that rotates substantially coaxially with respect to the spool, and one regulating portion integrally disposed on the rotating member that limits displacement of the coupling pawl toward the engaged position.

2. The webbing take-up device of claim 1, wherein the rotating body comprises a sensor gear that is rotatably supported on a torsion shaft coupled to the spool.

3. The webbing take-up device of claim 2, wherein the coupling pawl that is mounted on the sensor gear is pivotable around an axis substantially parallel to the axial direction of the torsion shaft.

4. The webbing take-up device of claim 3, wherein the lock member comprises a lock pawl that is pivotably supported and includes a shaft whose axial direction is substantially parallel to the axial direction of the spool.

5. The webbing take-up device of claim 4, wherein the acceleration detecting unit includes an acceleration sensor associated with the coupling pawl.

6. The webbing take-up device of claim 5, wherein the rotation detecting unit includes a gear ring disposed in association with the torsion shaft, and said W pawl is supported about an axis substantially parallel to the torsion shaft, and said rotation detecting unit further includes a friction spring that rotates integrally with the gear ring, with a mass being attached to the W pawl, and one end of a return spring being attached to the W pawl.

7. The webbing take-up device of claim 1, wherein:

rotation of the spool is transmitted to the rotating member after rotation speed reduction such that the rotating member rotates substantially coaxially with respect to the spool by a predetermined angle of less than one rotation from a pulled-out state, where the webbing belt has been completely pulled out from the spool, up to a completely taken-up state, where the webbing belt has been taken up and accommodated onto the spool, and wherein said one regulating portion that is integrally disposed on the rotating member in the completely taken-up state, faces the coupling pawl opposite to the direction in which the coupling pawl displaces toward the engaged position and limits the displacement of the coupling pawl toward the engaged position by direct blocking contact with the coupling pawl.

8. The webbing take-up device of claim 7, wherein the rotating member comprises a cam plate that is rotatably supported on the torsion shaft.

9. The webbing take-up device of claim 8, wherein the regulating portion comprises a stopper that extends from part of the outer periphery of the cam plate toward a sensor gear.

10. A webbing take-up device comprising:

a spool to which a base end portion of a long band-like webbing belt is attached, with the spool taking up and accommodating the webbing belt as a result of the spool being rotated in a take-up direction that is one direction around its axis, and from which the webbing belt is pulled out as a result of the spool being rotated in a pullout direction opposite from the take-up direction due to the webbing belt being pulled toward its leading end;

a rotating body that is coaxially relatively rotatable with respect to the spool;

a coupling pawl that is movably mounted on the rotating body such that it is displaceable between a position where the coupling pawl is directly or indirectly engaged with the spool and a position where the coupling pawl disengages from the spool, and when the coupling pawl is directly or indirectly engaged with the spool, the coupling pawl causes the rotating body to rotate in the pullout direction together with the spool rotating in the pullout direction;

a lock member that directly or indirectly engages with the spool in conjunction with the rotating body rotating in the pullout direction and regulates the rotation of the spool in the pullout direction;

an acceleration detecting unit that is actuated when a vehicle disposed with the webbing take-up device abruptly decelerates, and which causes the coupling pawl to move on the rotating body to the engaged position;

rotation detecting unit including a W pawl that is actuated by an abrupt rotation of the spool in the pullout direction and wherein movement of the W pawl causes the coupling pawl to move on the rotating body to the engaged position with the V gear; and regulating unit that engages with the coupling pawl when the webbing belt has been taken up and accommodated onto the spool and regulates the displacement of the coupling pawl toward the engaged position, wherein the regulating unit comprises:

a rotating member to which the rotation of the spool is transmitted after rotation speed reduction and which rotates substantially coaxially with respect to the spool by a predetermined angle of less than one rotation from a pulled-out state, where the webbing belt has been completely pulled out from the spool, up to a completely taken-up state, where the webbing belt has been taken up and accommodated onto the spool, and one regulating portion that is integrally disposed on the rotating member, and which, in the completely taken-up state, faces the coupling pawl opposite to the direction in which the coupling pawl displaces toward the engaged position and regulates the displacement of the coupling pawl toward the engaged position by direct blocking contact with the coupling pawl.

11. The webbing take-up device of claim 10, wherein the coupling pawl is pivotally mounted on the rotating body.

* * * * *